United States Patent
Bilski et al.

(10) Patent No.: US 7,490,227 B1
(45) Date of Patent: Feb. 10, 2009

(54) METHOD AND SYSTEM TO RECREATE INSTRUCTION AND DATA TRACES IN AN EMBEDDED PROCESSOR

(75) Inventors: Goran Bilski, Molndal (SE); Jorge Ernesto Carrillo, San Jose, CA (US); Usha Prabhu, West Lafayette, IN (US); Navaneethan Sundaramoorthy, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 261 days.

(21) Appl. No.: 10/930,437

(22) Filed: Aug. 31, 2004

(51) Int. Cl.
*G06F 11/25* (2006.01)

(52) U.S. Cl. .................. 712/227; 714/735; 714/742; 717/131

(58) Field of Classification Search .............. 712/227; 714/735, 742; 717/131
See application file for complete search history.

(56) References Cited

U.S. PATENT DOCUMENTS

| | | | | |
|---|---|---|---|---|
| 4,636,940 A | * | 1/1987 | Goodwin, Jr. | ............... 717/128 |
| 5,600,845 A | | 2/1997 | Gilson | |
| 5,845,064 A | * | 12/1998 | Huggins | ....................... 714/33 |
| 6,145,123 A | * | 11/2000 | Torrey et al. | ................ 717/128 |
| 6,859,891 B2 | * | 2/2005 | Edwards et al. | ............... 714/30 |
| 7,080,283 B1 | * | 7/2006 | Songer et al. | ................. 714/30 |

OTHER PUBLICATIONS

Patterson, David. Hennessy, John. "Computer Architecture: A Quantitative Approach". Morgan Kaufmann Publishers, Third Edition, pp. 390-394. May 17, 2002.*
Wikipedia: "Field-programmable Gate Array". Jul. 21, 2004. Obtained via http://wikipedia.org.*

* cited by examiner

*Primary Examiner*—Eddie P Chan
*Assistant Examiner*—Robert E Fennema
(74) *Attorney, Agent, or Firm*—Pablo Meles; Kevin T. Cuenot

(57) ABSTRACT

A method of recreating instructions and data traces in a processor can include the step of fetching an instruction from an executable program in an order corresponding to sequential program counter (PC) values, obtaining a destination register from the fetched instruction and updating the destination register in a data structure with a value from a collected destination register corresponding to the PC value. The steps above can be repeated until all desired PC values and destination values are obtained.

12 Claims, 3 Drawing Sheets

METHOD AND SYSTEM TO RECREATE INSTRUCTION AND DATA TRACES IN AN EMBEDDED PROCESSOR

BACKGROUND

1. Field of the Invention

The invention relates to the instruction and data tracing, more particularly, to instruction and data tracing in an integrated circuit (IC) having an embedded processor.

2. Description of the Related Art

There are various products available that enable tracing of data produced by a software program executed by a processor. The data trace is used to debug and optimize the software program. The conventional data trace is voluminous and occupies a large amount of storage. However, for a processor embedded in an integrated circuit, the amount of trace data that can be collected is either limited by the amount of embedded memory, if the trace data is stored on the IC, or by the transfer throughput, if the trace data is stored in external memory.

In addition, conventional data tracing tools do not allow the recreation of the state of the processor after an execution of one or more instructions of the software program.

Thus there is a need for a reduced amount of data for a data trace and the ability to reconstruct the full processor state.

SUMMARY OF THE INVENTION

Embodiments in accordance with the present invention provides a method, system, and apparatus for recreating instruction and data traces of a processor, such as an embedded processor, executing a software program. An embedded processor can include one or more processors used on a System on a Chip (SoC). More particularly, an embodiment of the present invention can include the steps of fetching instructions from an executable program in an order corresponding to sequential program counter values to provide a fetched instruction, obtaining a destination register from the fetched instruction, and updating the destination register in a data structure with a value from a collected destination register corresponding to the program counter value. The method can further include the step of repeating the steps above until all desired program counter values and destination values are obtained. The step of fetching can also include fetching instructions for real-time processor executed and disassembled program instructions corresponding to the sequential program counter values. The destination register can be obtained from a disassembled instruction having the fetched instruction. Note that the value from the collected destination register corresponding to the program counter value can be a data trace and the method can further include the step of recreating the data trace and the state of the embedded processor after each instruction is executed without necessarily stopping the embedded processor.

In another embodiment of the present invention, an embedded processor can include a processor programmed to fetch an instruction from an executable program in an order corresponding to sequential program counter values, obtain a destination register from the fetched instruction, and update the destination register in a data structure with a value from a collected destination register corresponding to the program counter value forming a data trace. The processor can further be programmed to recreate full instructions and data traces from the embedded processor by repetitively fetching instructions, obtaining destination registers, and updating registers in the data structure until all desired program counter values and destination values are obtained.

In yet another embodiment of the present invention a system for storing trace data of a software program executed on a processor embedded in an integrated circuit (IC) is described. The system includes: a program counter (PC) and a destination register located in the processor; a plurality of software instructions stored in a first storage location; a destination register value produced by executing an instruction by the processor, wherein an address of the instruction is given by a PC value; and a second storage location having the PC value and the destination register value. In an alternative embodiment the IC includes a PLD, such as the Virtex II Pro™ field programmable gate array (FPGA) from Xilinx® Inc. of San Jose, Calif.

Other embodiments of the present invention, when configured in accordance with the inventive arrangements disclosed herein, can include a system for performing, and a machine readable storage for causing a machine to perform, the various processes disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
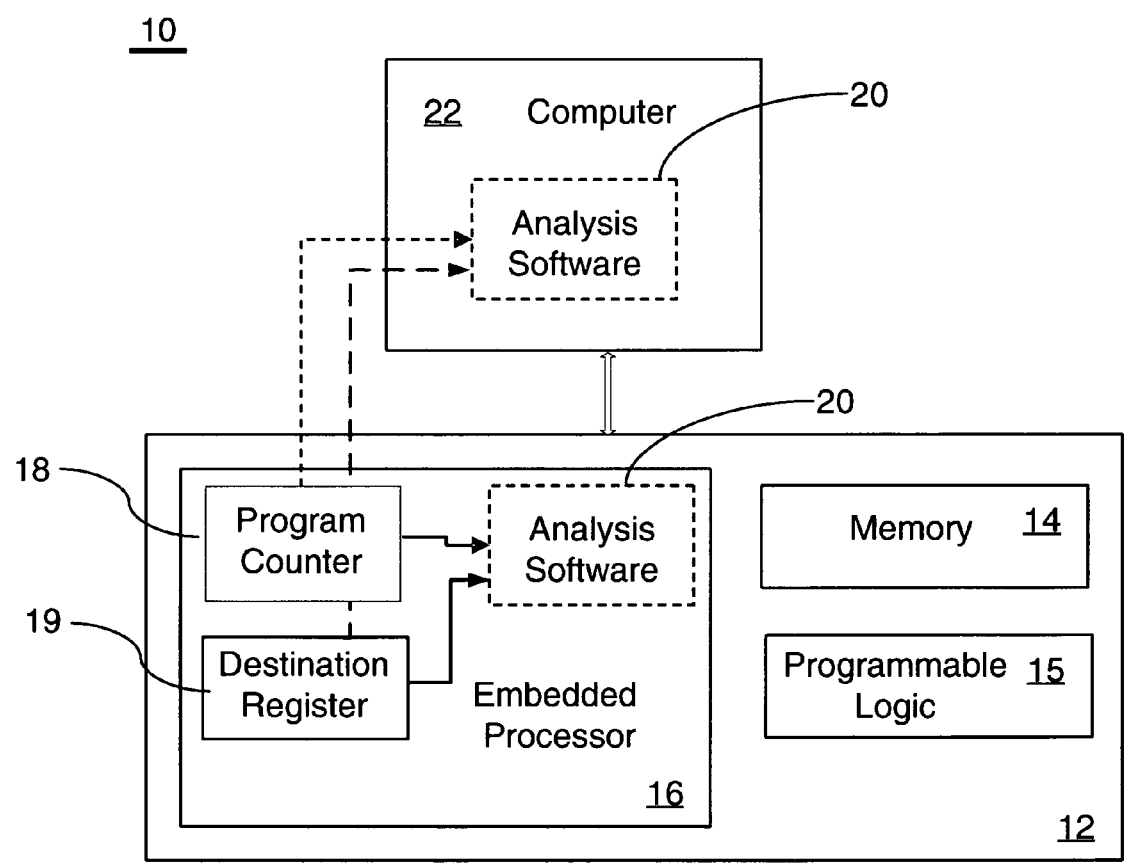
FIG. 1 is a block diagram of a system for recreating full instructions and data traces in a processor in accordance with one embodiment of the inventive arrangements disclosed herein.

Embodiments in accordance with the present invention can retrieve required data, namely a program counter (PC) value and a result register or destination register value for every instruction executed in a processor. The processor can be an embedded processor such as a hardcore PowerPC® from IBM® Inc. of White Plains, N.Y., located in the Virtex II Pro™ field programmable gate array (FPGA) from Xilinx® Inc. of San Jose, Calif. or a softcore such as the MicroBlaze™ processor from Xilinx, Inc., which is configured in the fabric of the FPGA. In some embodiments the IC may include programmable logic or the IC can be a programmable logic device (PLD) such as a FPGA or a complex programmable logic device (CPLD). In one embodiment, a program can analyze the executed instructions and recreate the trace and state of the processor after each instruction was executed. Using collected data, a program, and a data structure with a known start state to store the processor state at any point in time, the full state of the processor can be recreated after each instruction is executed. Referring to FIG. 1, a processor 16 is shown embedded within an IC 12 such as an FPGA. The IC 12 further includes memory 14 such as RAM or ROM that can contain registers (address, destination, etc.) and programmable logic 15, for example, one or more configurable logic blocks (CLBs) as found on Xilinx's Virtex II Pro. The processor 16 can also include a program counter (PC) 18 and a destination register(s) 19, both of which can be analyzed by analysis software 20. The analysis software 20 can either be on the IC 12 itself and executed by the processor 16 or the analysis software 20 can reside on a computer 22 linked to the IC 12. The operation of the analysis software 20 will become more apparent in the description of the flow chart and the specific example given below.

When a predetermined software program (not shown) is executed on an embedded processor 16, the programmable logic 15 can be configured to store the contents of the PC and destination or result register associated with each executed instruction of the predetermined software program in memory 14. Thus each PC value will have an associated collected destination register value. The PC values are in sequential order in one embodiment, and reflect order of instruction execution of the predetermined software program by the embedded processor 16.

Figure 2A:
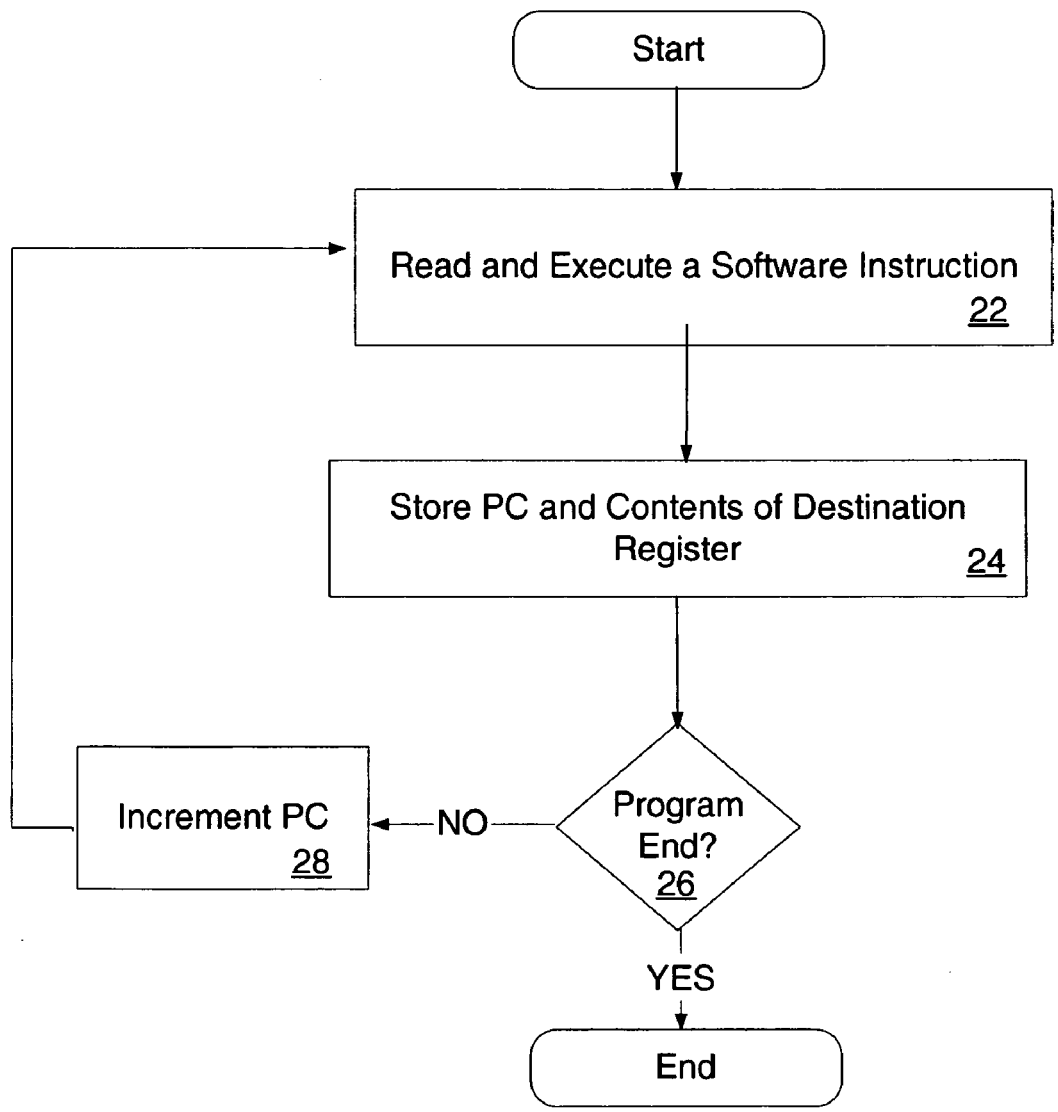
FIG. 2A is a flowchart of the creation of the (PC, Destination Register) pairs of a data trace of an embodiment of the present invention.

FIG. 2A is a flowchart of the creation of the (PC, Destination Register) pairs of trace data as each instruction in the predetermined software program is executed. At step 22 a software instruction is read from the address given in the PC and the software instruction is executed by the processor. The software instruction may include where the result of the instruction is to be written to, e.g., a destination register. In one embodiment, if there is no destination register, step 24 is skipped. In another embodiment, the destination register may have a pointer to another location, which has the desired value. At step 24 the address of the instruction given by the PC and the value of the destination register of the instruction are stored either on the IC 12 or in external memory such as on the computer 22. At decision block 26 if there are more instructions in the software program then the PC is incremented (step 28) and the steps 22-26 are repeated. If there are no more instructions then the process ends.

Figure 2B:
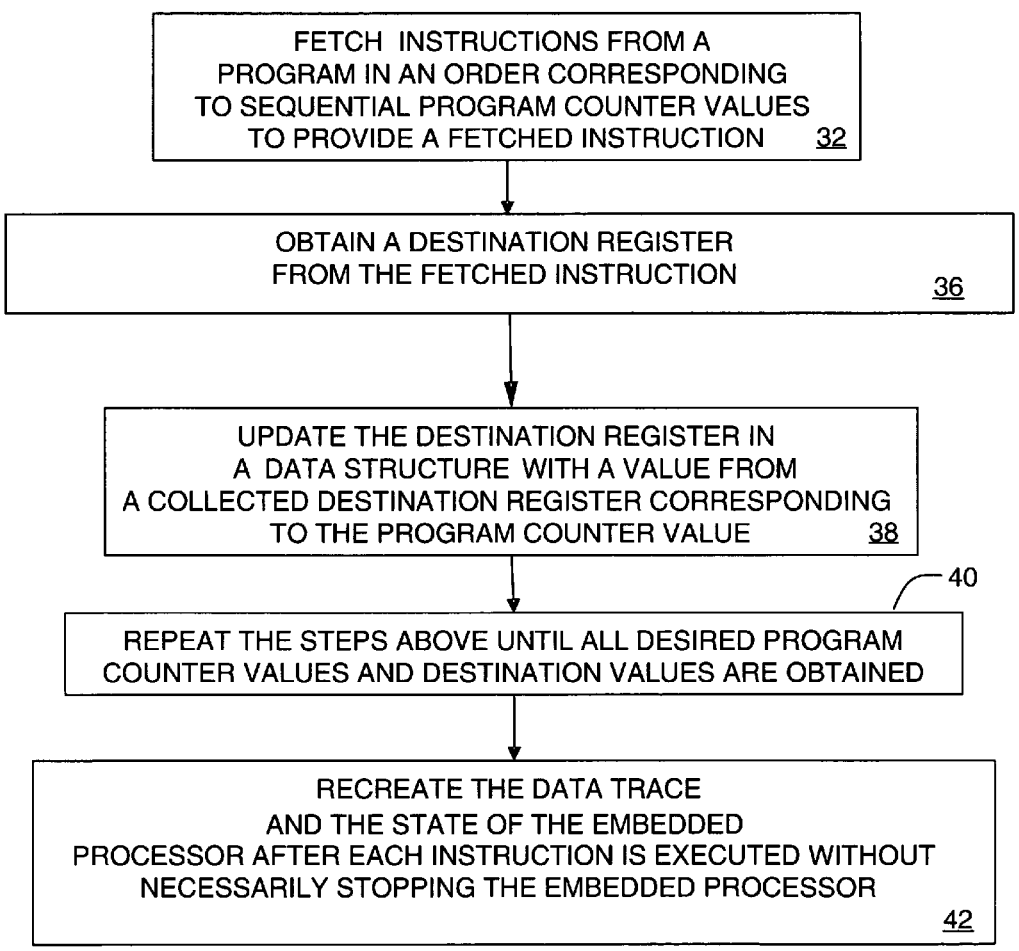
FIG. 2B is a flow chart illustrating a method of recreating full instructions and data traces in a processor in accordance with one embodiment of the inventive arrangements disclosed herein.

Referring to FIG. 2B, a flow chart illustrating a method 30 of recreating instructions and data traces in a processor is shown. More particularly, the method 30 can include the step 32 of fetching instructions from an executable program in an order corresponding to sequential program counter values to provide a fetched instruction. Optionally, the instructions fetched are for real-time executed program instructions corresponding to the sequential program counter values. The method 30 can then obtain at step 36 a destination register from the fetched instruction and update at step 38 the destination register in a data structure with a value from a collected destination register (previously collected in FIG. 2A) corresponding to the program counter value. As indicated at step 40, the steps above can be repeated until all desired program counter values and destination values are obtained. Note that the destination register can be obtained from the fetched instruction and that the value from the collected destination register corresponding to the program counter value can be a data trace. Finally, the method 30 further include the step 42 of recreating the data trace and the state of the embedded processor after each instruction is executed without necessarily stopping the embedded processor.

To provide a more specific illustration how the method of software analysis 20 operates, a specific example is given. Consider the following sample of data collected during a real-time processor execution and the relevant part of the assembly language program that the processor was executing.

The collected data includes the contents of the program counter, e.g., PC=hexadecimal a0, and the contents of the destination register associated with the instruction located at the address given by PC, e.g. for PC=a0, the destination register (Dest. Reg.) has contents "3974" hexadecimal. A sample of the collected data for the above example is:

| PC | Dest. Reg. | |
|----|------------|---|
| a0 | 3974 | <-- Cycle 1 |
| a4 | 27f4 | <-- Cycle 2 |
| a8 | 224ac | <-- Cycle 3 |
| ac | 0 | . |
| b0 | 1184 | . |
| b4 | 27f0 | . |
| b8 | ff3b1120 | . |
| ac | 0 | . |
| b0 | 1188 | . |
| b4 | 27ec | . |
| b8 | ff3b1120 | <-- Cycle N |

The relevant locations and contents of part of the assembly language program that generates the above sample of the collected data are:

| Address | Contents | Instruction | | |
|---------|----------|-------------|---|---|
| 9c: | 20c01180 | addi | r6, r0, 4480 | |
| a0.: | 20e03974 | addi | r7, r0, 14708 | <-- Cycle 1 |
| a4: | 06463800 | rsub | r18, r6, r7 | <-- Cycle 2 |
| a8: | bc720014 | blei | r18, 20  // bc | <-- Cycle 3 |
| ac: | d8060000 | sw | r0, r6. r0 | |
| b0: | 20c60004 | addi | r6, r6, 4 | |
| b4: | 06463800 | rsub | r18, r6, r7 | |
| b8: | bc92fff4 | bgti | r18, −12 | // ac |
| bc: | b9f40e58 | brlid | r15, 3672 | // f14 <_program_init> |
| c0: | 80000000 | or | r0, r0, r0 | |

The above sample of collected data is stored in a computer readable medium either on the PLD 12 or off the PLD such as in computer 22. The collected data along with the associated software instructions, which generated the collected data, e.g., the above the assembly language program, represent a trace of the data as well as the associated software instructions. The data trace is given by the contents of the stored destination register and the instruction trace is given by the contents of the PC and associated instructions in the assembly language program.

The stored collected data and assembly language program in conjunction with a data structure associated with the embedded processor state, e.g., the processor's general purpose registers r0 to r18, are used to recreate the full processor state.

An example of the steps used to recreate part of the full processor state using the above sample of collected data and associated assembly language program instructions for the first three cycles are:

First iteration (Cycle 1)

1) Get the instruction from the program at PC-value
When PC=a0 (Cycle 1), Instruction=20e03974

2) Obtain the Destination Register from the instruction, where the Destination Register for 20e03974 {addi r7, r0, 14708) is r7

3)—Update the Data Structure with the value of the destination register r7 from the collected data, which is 3974 for PC=a0 (Cycle 1)

Sample Data Structure (only 8 registers shown):

R0: XXXXXXXX
R1: XXXXXXXX
R2: XXXXXXXX

-continued

```
R3: XXXXXXXX
R4: XXXXXXXX
R5: XXXXXXXX
R6: XXXXXXXX
R7: 00003974
```

Second iteration (Cycle 2)
1) Get instruction from program at PC value.
   When PC=a4 (Cycle 2), Instruction=06463800
2} Obtain the-Destination Register from instruction
   Destination Register for 05463800 (rsub r18, r6, r7) is r18
3) Update the Data Structure value with value from the collected data
   Value from collected data is 27f4 (Cycle 2)
Sample Data Structure (only 9 registers shown):

```
R0: XXXXXXXX
R1: XXXXXXXX
R2: XXXXXXXX
R3: XXXXXXXX
R4: XXXXXXXX
R5: XXXXXXXX
R6: 00001180
R7: 00003974
...
R18: 000027f4
```

Note that at this point the software analysis 20 can assume that R6 had the value 00001180, because the result of the subtraction (R7−R6) was 27f4. Thus, the data structure can be filled in if no value exists or a flag can be provided in the case of any possible error if there is a mismatch.

Third iteration (Cycle 3)
1) Get instruction from program at PC value.
   When PC=a8 (Cycle 3), Instruction=bc720014
2) Instruction is a branch instruction, which does not use a Destination Register. Thus, the instruction can be skipped and the next PC value is analyzed to determine whether there was a branch or not.
3} Nothing to update.

The process continues until finished with the collected data.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A method of recreating instructions and data traces in an embedded processor, comprising:
   fetching instructions from an executable program in an order corresponding to sequential program counter values to provide fetched instructions;
   determining whether the fetched instructions specify a destination register;
   obtaining a destination register from each fetched instruction, if specified;
   for each instruction specifying a destination register, storing, in a data structure, a data pair consisting of a value from a collected destination register and a corresponding program counter value and, for instructions that do not specify a destination register, not storing data in the data structure, wherein the value from the collected destination register corresponding to the program counter value comprises a data trace; and
   recreating the data trace and the state of the embedded processor after each instruction is executed by retrieving a data pair from the data trace and determining a register of the embedded processor from which a stored value of the data pair was collected according to an instruction of the executable program corresponding to a program counter value of the data pair.

2. The method of claim 1, wherein the step of fetching instructions comprises the step of fetching instructions for real-time processor executed program instructions corresponding to the sequential program counter values.

3. The method of claim 1, further comprising repeating the steps above until all desired program counter values and destination values are obtained.

4. The method of claim 1, wherein the step of recreating the data trace and the state of the embedded processor occurs without stopping the embedded processor.

5. An embedded processor, comprising:
   a processor programmed to:
      fetch an instruction from an executable program in an order corresponding to sequential program counter values;
      obtain a destination register from the fetched instruction, if specified;
      selectively update the destination register in a data structure with a value from a collected destination register corresponding to the program counter value forming a data trace according to whether a destination register is specified by the fetched instruction, wherein only the value from the collected destination register and the corresponding program counter value are stored for each instruction that specifies a destination register, wherein no data is stored for instructions that do not specify a destination register; and
      recreate full instructions and data traces from the embedded processor by repetitively fetching instructions, obtaining destination registers, and updating registers in the data structure until all desired program counter values and destination values are obtained wherein the value from the collected destination register corresponding to the program counter value comprises a data trace;

recreate the data trace and the state of the embedded processor after each instruction is executed; and wherein the processor recreates the data trace and the state of the embedded processor after each instruction is executed by retrieving, from the data trace, a data pair comprising a program counter value and a stored value collected from a destination register and determining a resister of the embedded processor from which the stored value of the data pair was collected according to an instruction of the executable program corresponding to the program counter value of the data pair.

6. The processor of claim 5, wherein the processor is further programmed to fetch instructions for real-time processor executed program instructions corresponding to the sequential program counter values.

7. The processor of claim 5, wherein the processor obtains the destination register from a disassembled instruction having the fetched instruction, when creating full instructions and traces.

8. The processor of claim 5, wherein the processor is further programmed to recreate the data trace and the state of the embedded processor without stopping the embedded processor.

9. A machine-readable storage medium, having stored thereon a computer program having a plurality of code sections executable by a machine for causing the machine to perform the steps of:

fetching instructions from an executable program in an order corresponding to sequential program counter values;

determining whether the fetched instructions specify a destination register;

obtaining a destination register from each fetched instruction, if specified;

for each instruction specifying a destination register, storing, in a data structure, a data pair consisting of a value from a collected destination register and a corresponding program counter value and, for instructions that do not specify a destination register, not storing data in the data structure, wherein the value from the collected destination register corresponding to the program counter value comprises a data trace; and recreating the data trace and the state of the embedded processor after each instruction is executed by retrieving, from the data trace, a data pair and determining a register of the embedded processor from which a stored value of the data pair was collected according to an instruction of the executable program corresponding to a program counter value of the data pair.

10. The machine-readable storage medium of claim 9, wherein the machine-readable storage medium is further programmed to fetch instructions for real-time processor executed program instructions corresponding to the sequential program counter values.

11. The machine-readable storage medium of claim 9, further comprising repeating the steps above until all desired program counter values and destination values are obtained.

12. The machine-readable storage medium of claim 9, wherein the machine-readable storage medium is further programmed to recreate the data trace and the state of the embedded processor without stopping the embedded processor.

* * * * *